United States Patent
Broussard

(10) Patent No.: US 7,602,288 B2
(45) Date of Patent: Oct. 13, 2009

(54) METHOD FOR SLAP-AND-SHIP RFID LABELING

(75) Inventor: Michael Clayton Broussard, Dallas, TX (US)

(73) Assignee: Frito-Lay North America, Inc., Plano, TX (US)

( * ) Notice: Subject to any disclaimer, the term of this patent is extended or adjusted under 35 U.S.C. 154(b) by 789 days.

(21) Appl. No.: 11/291,587

(22) Filed: Dec. 1, 2005

(65) Prior Publication Data

US 2007/0126578 A1 Jun. 7, 2007

(51) Int. Cl.
*G08B 13/14* (2006.01)

(52) U.S. Cl. .............. 340/572.1; 340/572.7; 340/572.8; 340/10.1; 235/385

(58) Field of Classification Search ............... 340/572.1, 340/572.4, 572.7, 572.8, 10.1, 825.32, 5.92; 235/375, 383, 385; 700/30
See application file for complete search history.

(56) References Cited

U.S. PATENT DOCUMENTS

| | | | |
|---|---|---|---|
| 6,724,308 B2 * | 4/2004 | Nicholson | ................ 340/572.1 |
| 6,746,702 B1 | 6/2004 | Robie | |
| 7,216,806 B2 * | 5/2007 | Kurita et al. | ................ 235/385 |
| 7,218,231 B2 * | 5/2007 | Higham | .................... 340/572.1 |
| 7,227,470 B2 * | 6/2007 | Nedblake | .................. 340/572.1 |
| 7,267,269 B2 * | 9/2007 | Kikuchi | ...................... 235/383 |
| 7,394,382 B2 * | 7/2008 | Nitzan et al. | ............. 340/572.8 |
| 7,554,449 B2 * | 6/2009 | Higham | .................... 340/572.1 |
| 2006/0054682 A1 * | 3/2006 | de la Huerga | ............... 235/375 |
| 2006/0212141 A1 * | 9/2006 | Abraham et al. | .............. 700/30 |

* cited by examiner

*Primary Examiner*—Davetta W Goins
(74) *Attorney, Agent, or Firm*—Colin P. Cahoon; Carstens & Cahoon, LLP

(57) ABSTRACT

A method for applying at least one RFID product tag to each of a plurality of products and to a product-containing container. Each product, case, or box is first unloaded from a container (e.g. pallet, tote, crate) or passed directly from manufacturing onto a conveyor whereon each item receives at least one RFID tag. Each RFID tag is then verified. Multiple items are then re-stacked in a container. An RFID tag is applied to the container and then the RFID tags are verified again before the container is shipped. Serialized numbers corresponding to products and containers are assigned and tracked. EPC data is stored on, or associated with, each RFID tag. RFID tags are verified to detect faulty placement and non-functionality. Non-functioning and poorly placed RFID tags are replaced before passing verification. The slap-and-ship line can handle execute-and-record methods and synchronized execution methods of handling product and associated data.

21 Claims, 7 Drawing Sheets

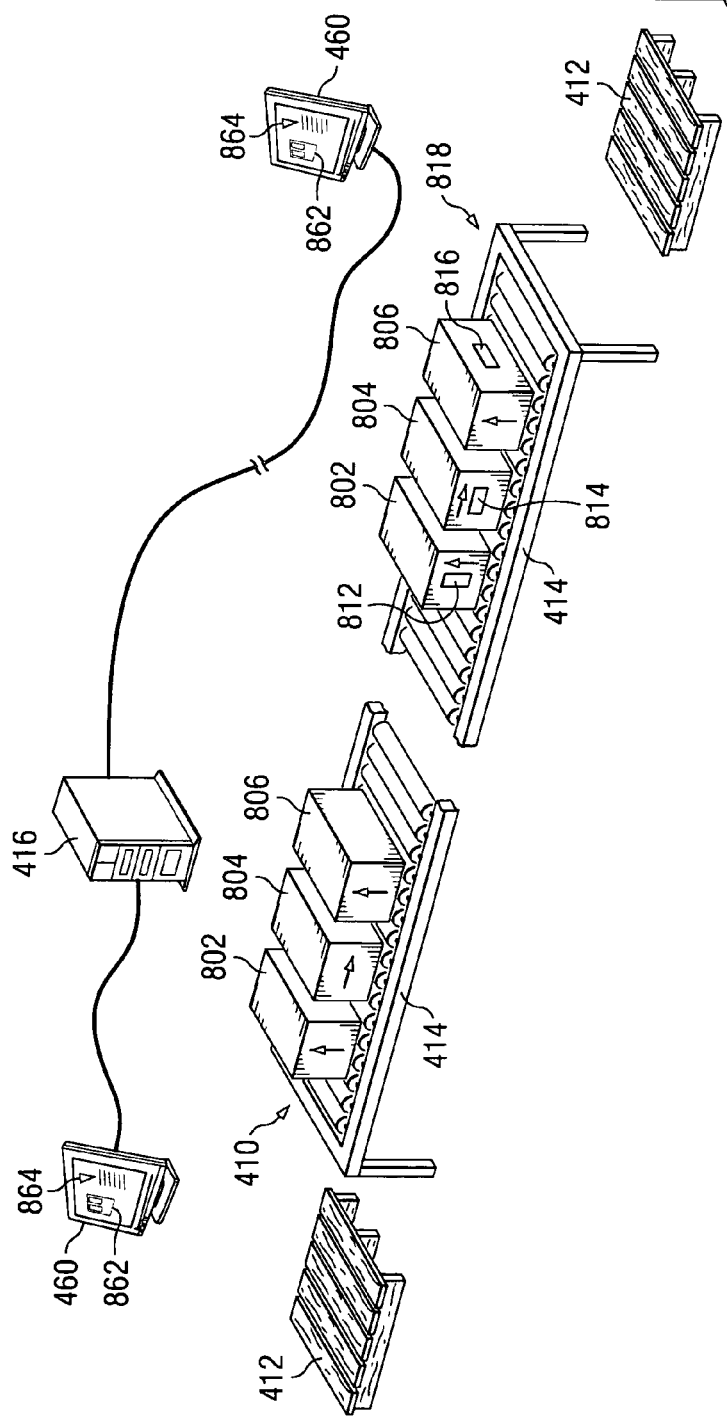
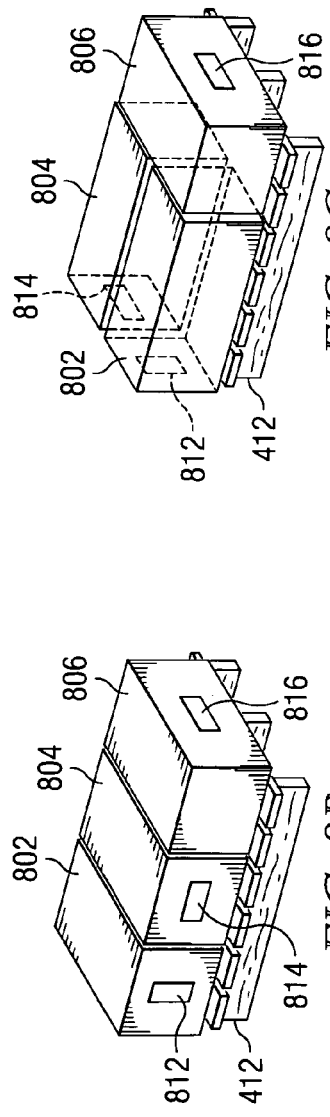
FIG. 8A
FIG. 8B
FIG. 8C

METHOD FOR SLAP-AND-SHIP RFID LABELING

BACKGROUND

1. Technical Field

This invention relates to a method for applying radio frequency identification (RFID) tags to products, cases, pallets, or any other item, and specifically for applying and verifying RFID tags, and assigning and accounting for numbers and other product and product-related information such as serial numbers, global trade identification numbers (GTINs), electronic product codes (EPCs), and stock keeping units (SKUs).

2. Description of Related Art

The present invention generally relates to radio frequency identification (RFID) tags, and more particularly to methods to apply RFID tags to items and manage the information associated there with. Such methods may be used in any environment, but particularly are advantageously used in supply chain and warehouse management environments.

FIG. 1 shows a typical RFID tag according to the prior art. With reference to FIG. 1, a typical RFID tag is comprised of an antenna 102, a microchip 104, and optionally an adhesive strip 106 to facilitate the placement of the RFID tag on an object. Optionally, on one side of an adhesive strip 106, human readable and other printed information may be affixed to the RFID tag. Many RFID tags and devices have the potential to carry a large quantity of information in contrast to conventional bar codes whose data capacity is limited. RFID tags may be read faster and at relatively larger distances, can be rewritten and updated repeatedly and easily, do not require line-of-sight reading, and can contain encrypted data or locked data. RFID tags can be easily tracked. By keeping RFID and allied data on a network resource such as a server, a service provider could enable stores and warehouses to use portable scanners to check the history of a tagged product. Retailers could check for authenticity or theft, as well as monitor product trends by tracking items. RFID tags may be programmable and may also include sensors that can record in the tag various environmental factors such as the amount of time a container was held at a given temperature.

In the manufacturing, shipping, supply chain, warehouse, and retail industries, RFID tags can be attached to one or more objects (e.g., containers, packages, products) for purposes of providing information about the objects. RFID tags are also referred to as RFID transponders. Such RFID tags can provide an RFID interrogator or reader with data that can directly or indirectly provide the information about the corresponding objects. A reading pulse of RF energy interrogates passive tags as the tags are brought near to the reader. The object information may be stored and retrieved using any number of techniques and data formats. The information may be part of the RFID response code or alternately maintained in a database external to the RFID interrogator with a correlation to the RFID identification sent by the RFID tag in response to an interrogation signal.

One problem often encountered with the use of RFID tags on multiple items stacked in a tote or on a pallet is that some tags escape interrogation and the information is not read from certain tags. Specifically, RF waves from an interrogator may not adequately reach the antenna of the RFID tag. A passive RFID tag ordinarily creates power from these RF waves and uses them to energize the circuits of the RFID chip. The chip in the RFID tag then sends information back to the reader.

FIG. 2 shows a typical RFID tag attachment process at a manufacturing, shipping or warehouse facility wherein certain problems may originate. With reference to FIG. 2, as a product 204 travels down a conveyor 206, a worker or machine 208 affixes a functioning RFID tag 202A to it. A product 204 may be an individually packaged product, tote, crate, box, or other object.

As products 204 are stacked onto a pallet for further handling and shipping, some RFID tags are broken. In one study, the failure rate of applying RFID tags to products was one percent. Further, some RFID tags are placed in a poor location relative to the container and may be unreadable by an RFID tag interrogator. For example, an RFID tag 202C could be inadvertently placed in the middle of a side of a container 204 wherein a large metal or liquid object 212 resides. Such placement could at least partially obstruct and/or interfere with an interrogation signal emitted by the RF interrogator 216 and/or interfere with a response signal emitted by the RFID tag 202C. An RF interrogator 216 may be built near a door or gateway so as to scan and read RFID tags 202 as they leave or arrive as part of a shipment. Such placement may be non-ideal and may further contribute to failing to detect some RFID tags.

Alternatively, problems may arise when some containers carrying RFID tags stacked in such a manner that the tags are in a relatively poor location within the shipping container. For example, with are reference to FIG. 2, a product 204 having an RFID tag 202B could be stacked such that the RFID tag 202B is located toward the center of the pallet. A box placed in an adjacent space 210 could obstruct the functioning of the RFID tag 202B. In these situations, when the pallet 214 loaded with products 204 passes near interrogators 216 for scanning, certain of the RFID tags 202B, 202C may not function correctly. This translates to "lost" containers and a manual correction would have to be performed.

In the prior art, serialized numbers may be assigned to specific products or RFID tags before the RFID tags are encoded, affixed, and verified by interrogation. In such a case, additional effort would be wasted in tracking down serialized numbers assigned to non-functioning RFID tags or to products bearing non-functioning RFID tags.

Ideally, application and verification of RFID tags to products, stacked containers, and shipments would most easily be incorporated into the manufacturing and packaging processes. However, many manufacturing and packaging facilities do not incorporate the use of RFID tags into these processes.

Accordingly, a need exists for a process or method which allows either a machine or operators 224 to optimally apply RFID tags to products 204 and stack products 204 onto a pallet 214 or other container according to an optimal or desired arrangement of the RFID tags 202 relative to the exterior of the pallet 214. Further, a need exists for an efficient process and method to assign codes or other information to verifiably working RFID tags. A need exists to reliably and consistently place RFID tags onto items such that the RFID tags are optimally placed for a given arrangement of products in a container. A need exists to reliably and consistently stack items onto a pallet or other container whereby a sufficient number of products in such container may be interrogated and identified and thereby provide an improved means to identify the entire container and all products stacked therein.

Other desirable features and characteristics of the present invention will become apparent from the subsequent detailed description and the appended claims, taken in conjunction with the accompanying drawings and the foregoing technical field and background.

SUMMARY OF THE INVENTION

The present invention is a novel method to create and affix RFID tags to products and shipping containers, to ensure that each RFID tag is functional, and to optimize the placement of RFID tags on products in relation to eventual Ti/Hi stacking or bundling of products. Products and product information are first inducted into the SAS line and system, RFID tags are applied to each product, RFID tags are then tested, and labeled products are unitized or re-bundled for further handling and shipment. RFID tag functionality is tested three times: (1) prior to application; (2) after placement on each product; and (3) after products are unitized or stacked into shipping containers. An improved method generates and associates product and shipping information with each RFID tag either before or after each tag is verified. The association of such information may be done after any of the three mentioned function checks. Such information subsequently may be tracked through the shipping and delivery process.

Further objects of the present invention will become apparent in the following detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 8A is a perspective view of the induction and exiting ends of a slap-and-ship line illustrating that each product may be oriented differently according to a desired set of instructions;

FIG. 8B is a perspective view of a first arrangement of products shown in FIG. 8A and stacked onto a container wherein RFID tags are on adjacent sides of the container;

FIG. 8C is a perspective view of a second arrangement of products shown in FIG. 8A and stacked onto a container wherein RFID tags are on opposites sides of the container;

REFERENCE NUMERALS

Figure 1A:
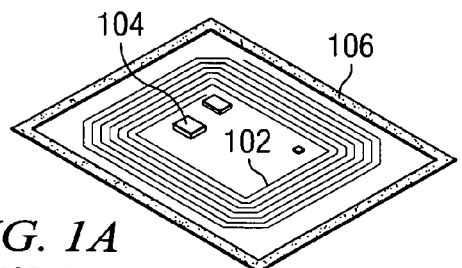
FIG. 1 is a perspective view of an RFID tag according to the prior art.
Figure 1B:
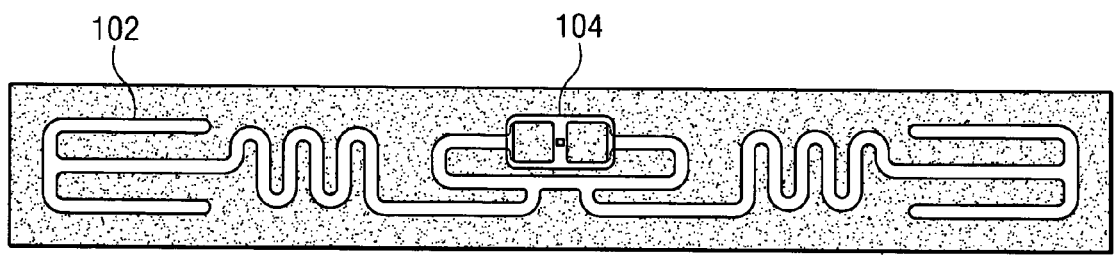
Figure 1C:
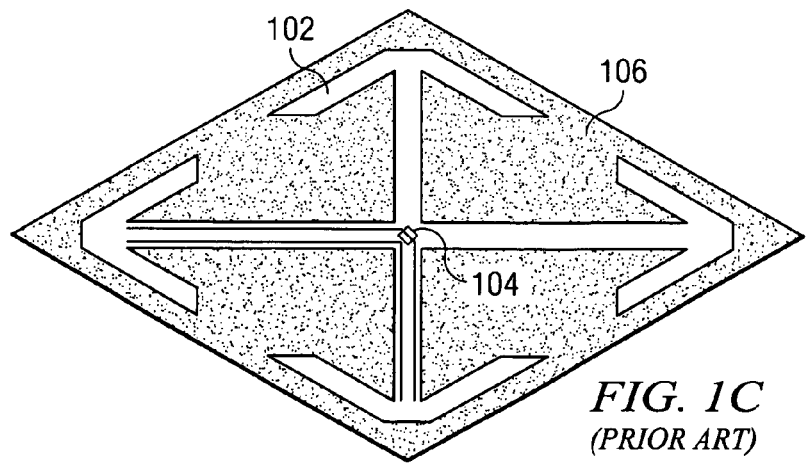
Figure 2:
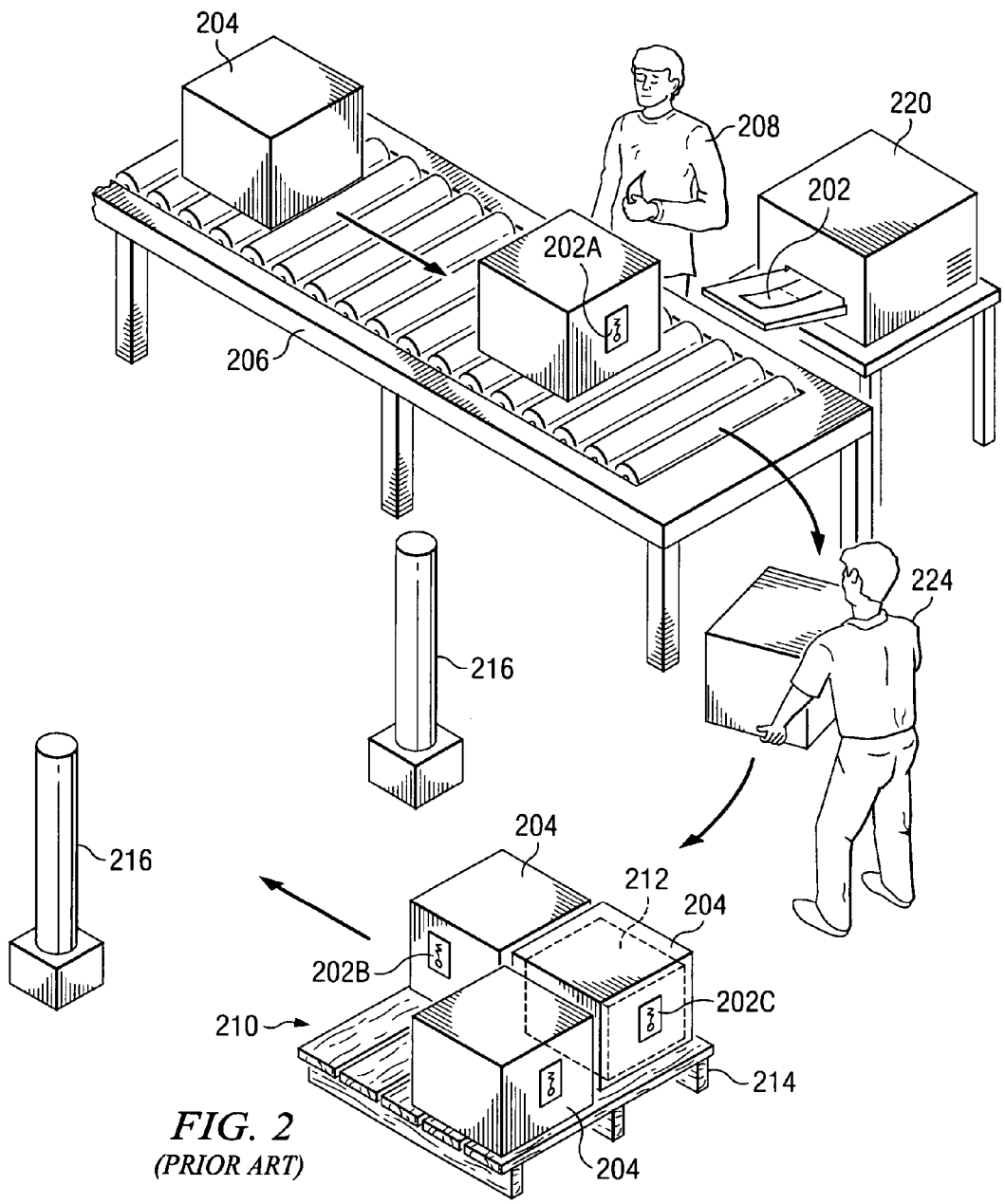
FIG. 2 is a perspective view of an assembly line within a typical prior art manufacturing and warehousing management environment wherein RFID tags are applied to products and containers illustrating where and how problems may arise.

102 RFID antenna
104 microchip
106 adhesive strip
202 RFID tag
202A functioning RFID tag
202B RFID tag in center of pallet
202C RFID tag on middle of side of container
204 product
206 conveyor
208 worker or machine
210 box placed in adjacent space
212 metal or liquid object inside container
214 pallet
216 RF interrogator
224 operator
302 manufacturer
304 warehouse
306 transportation stage
308 customer distribution center
310 slap-and-ship (SAS) line
402 product
404 line operator
404A induction operator
404B container building operators
404C re-work operators
404D warehouse operator
406 handheld scanning device
410 entry or induction end of SAS line
412 pallets
414 conveyor
416 SAS computer system
418 encode/print-and-apply device (EPAA)
420 verify station
422 RFID tag
424 invalid or failed RFID tag
426 rework line
430 desktop RFID encoder
432 RFID container tag
440 mechanical product handler
442 finished container
446 handheld interrogator
450 photo eye
460 computer screen
702 first side of a product
704 second side of a product
706 third side of a product
708 RFID tag along a side and over a top edge of a product
710 top side of a product
712 RFID tag placed on corner of a product
714 RFID tag on leading side of a product
716 center point of RFID tag
718 distance from a first edge of a product
720 distance from a second edge of a product
802 a third product, which is in a first orientation
804 a second product, which is in a second orientation
806 a first product, which is in said first orientation
812, 814, 816 RFID tags on products
818 exiting end of the SAS line
901-913 RFID tags 914 Discarded RFID tag
915 RFID tag affixed to an unstacked product
921-933 stacked products
938 RF signal Abbreviations
ASN Advanced Shipping Notice
DSD Direct Store Delivery
EDI Electronic Data Interchange
EPC Electronic Product Code
EPIC Electronic Product Identification Code
EPCIS Electronic Product Code Information System
ERP Enterprise Resource Planning
GLN Global Location Number
GTIN Global Trade Identification Number
GUI Graphical User Interface
LPN License plate number
RFID Radio Frequency Identification
SKU Stock Keeping Unit
SSCC Serialized Shipping Container Code
SSL Secure Socket Layering
SCM Supply Chain Management
UPC Universal Product Code
WMS Warehouse Management System

DETAILED DESCRIPTION

While the invention is described below with respect to a preferred embodiment, other embodiments are possible. The concepts disclosed herein apply equally to other similar methods for applying RFID tags to products and shipping containers of all varieties, and associating and tracking serialized numbers, product information, and shipping information in conjunction with each RFID tag. RFID tags may be either passive or active. Any type of RFID tag may be used with the invention including RFID tags of any shape, size, and having components of any shape, size, and functionality. Throughout this description, "product" refers to any item, unit, or individual product, while "container" refers to any shipping unit comprising multiple products. For example, a product may be a case of beverages, and a container may be a pallet, box, or crate.

Figure 3:
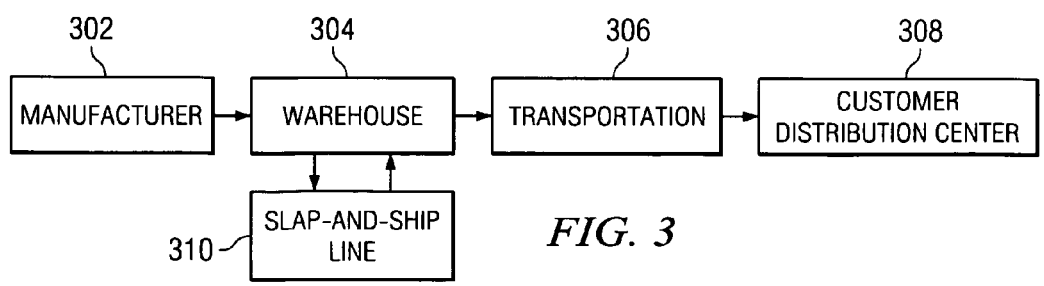
FIG. 3 is a flowchart of the overall process of using a slap-and-ship line in a manufacturing and shipping process according to one embodiment of the present invention.

FIG. 3 shows an overall schematic view of a manufacturing and shipping process in which an RFID tag application process may be integrated according to one embodiment of the present invention. With reference to FIG. 3, goods produced at a manufacturer 302 are sent to a warehouse 304. At the warehouse 304, it is desired to attach RFID tags to products and containers. In one embodiment, an RFID tag is comprised of at least license plate number (LPN) data or warehouse management system (WMS) data stored into one or more RFID components. Information which may be included within an RFID tag includes, but is not limited to: SSCCs, EPC data, SGTINs, an EPC version of SSCCs, a unique number, a product description, an encrypted number, an encrypted data string, a serial number, and/or a proprietary string of data. Alternatively, at least one GTIN or EPC product identifier is embedded or stored in the RFID tag. Any type and amount of information may be stored within an RFID tag.

With reference to FIG. 3, products are first taken to an induction side of a slap-and-ship (SAS) line 310. A SAS line 310 may be off-site, nearby, or just a conceptual step of warehouse product handling or manufacturing. Products are removed from containers and are sent individually onto the SAS line 310 whereon they receive an RFID tag. The products are then replaced into containers, and moved back to the warehouse 304. From the warehouse 304, the goods are typically moved through a transportation stage 306 before reaching a customer distribution center 308, retail outlet or other final destination. In one embodiment of this invention, no operator intervention is required.

Figure 4:
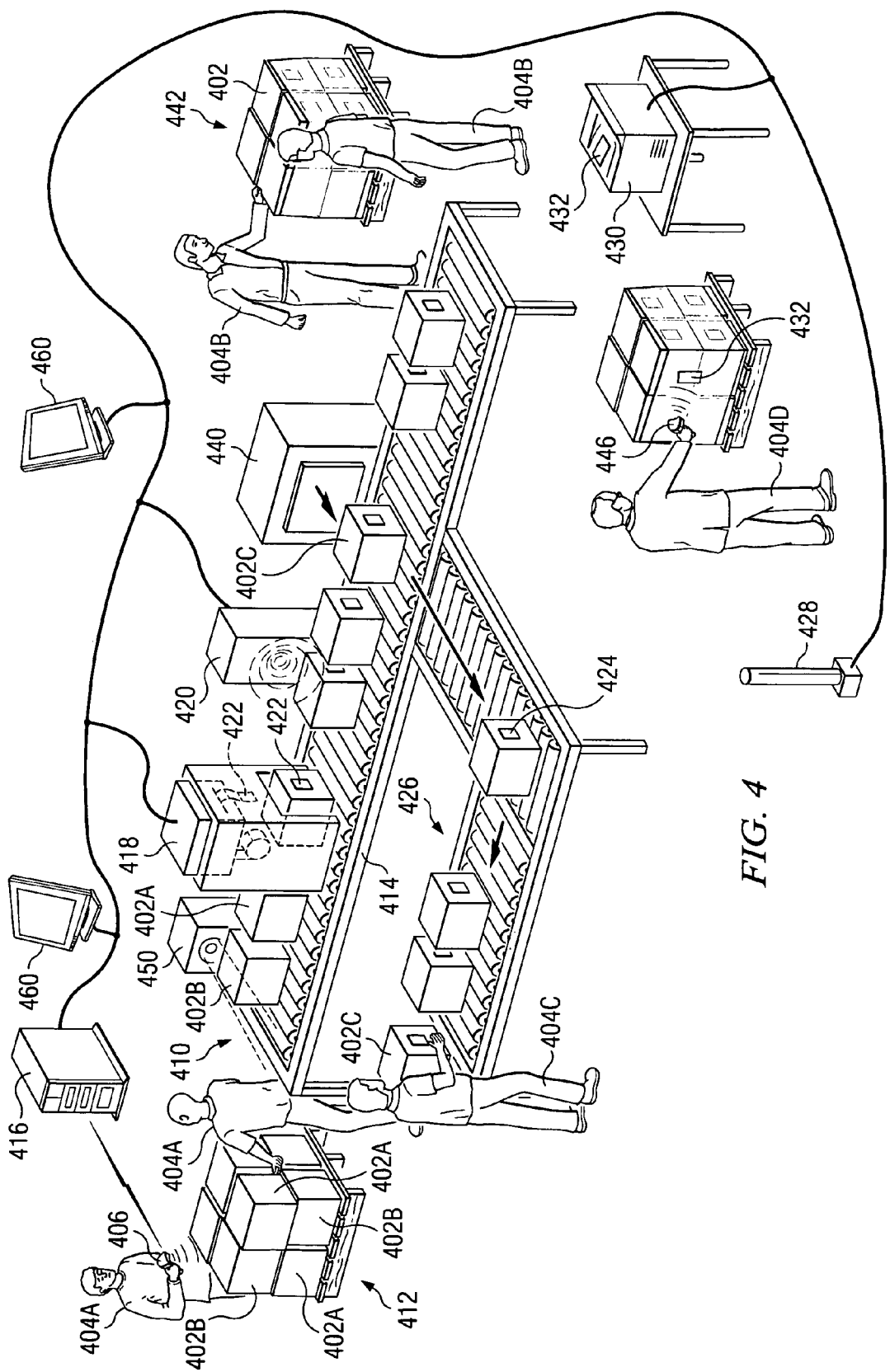
FIG. 4 is a perspective view of the principal components of a slap-and-ship RFID tag assembly line according to one embodiment of the present invention.

FIG. 4 shows a perspective view of one embodiment of a SAS line shown in FIG. 3. With reference to FIG. 4, induction operators 404A deliver containers of products to an induction end 410 of the SAS line; containers 412 (e.g. pallets) may be placed on stands to facilitate unloading and delivery. Optionally, only single-SKU containers 412 are processed at a SAS line. In a preferred embodiment, a variety of products 402A, 402B, each having a different SKU, may be found within a single container 412. Multiple containers 412 may be delivered and staged for RFID processing and may be processed by induction operators 404A in a random order. In one embodiment, it is preferable to induct all of the products from one container 412 before inducting products from other containers 412. However, in other embodiments, products are inducted in a completely random fashion. Varying products 402A, 402B may alternatively arrive directly from a manufacturing line and thus may not enter or leave a warehouse before being inducted onto a SAS line.

Optionally, an ergonomic container stand adjusts the height of the container to facilitate unstacking of the products 402A, 402B by an induction operator 404A. The SAS computer system 416 may provide direction or information to the induction operator 404A as to any required product orientation on the conveyor 414 and/or line set-up activities that must be performed prior to, or after, unloading of the products 402A, 402B.

At the beginning of a SAS line, and with reference to FIG. 4, as products 402A, 402B are unloaded onto a conveyor, each product 402A, 402B is scanned to acquire computer readable information (e.g. SKU or LPN bar codes) into a SAS computer system 416. In one embodiment, induction operators 404A use a wireless handheld scanning device 406 for acquiring such data. As an induction operator 404A scans the LPN, SKU, bar code, or other computer-readable or human-readable information available on each inducted product, a SAS computer system 416, electronically in communication with the handheld device 406, receives the information. Product or other information may be retrieved from a database using a SKU as a data key.

If the product 402A, 402B is recognized, the SAS computer 416 communicates the desired orientation for proper placement of the product 402A, 402B onto the conveyor 414. This information may be provided audibly or may be shown on a monitor or computer screen 460. For example, a computer screen 460 may show a picture or drawing of an identified product 402A, 402B properly oriented to a picture or drawing of the induction portion 410 of the SAS conveyor line or to the conveyor belt 414.

Alternatively, with reference to FIG. 4, a photo eye 450 or other automatic scanning component is built into the SAS line such that an induction operator 404A does not need to scan the inducted products 402A, 402B before or after placing the products 402A, 402B onto the SAS line. In this situation, as each product 402 is loaded onto the SAS line and begins processing, and if the product 402A, 402B is recognized, the system automatically orients the product 402A, 402B on the conveyor 414 by automated mechanical means (not shown) such that the product 402A, 402B is properly aligned for RFID tag placement. If the system does not recognize the product, the system does not affix an RFID tag to the product and rejects the product. In one embodiment, a rejected product is sent onto a rework line 426 by a mechanical product handler 440. In another embodiment, a rejected product is sent onto a separate reject line (not shown) specifically available for unrecognized inducted products. In one embodiment, such rejection may be done by automated means, and an induction operator 404A is only required to induct all products regardless of identity. In another embodiment, an unrecognized product may be passed to the end of the line without rejection for restacking onto the pallet; the RFID tag is simply not applied.

Optionally, induction operators 404A scan a container label (not shown) to acquire information about its products 402. Such scanning may be done either before or after introducing the individual products onto the induction end 410 of the SAS line. Using any of the scanned information, either from a container label or a product label, the SAS computer system 416 may also optionally query and retrieve related product information from an electronically connected WMS (not shown). The WMS may be the same computer as a SAS computer system 416 or may be a completely separate system electronically in connection with the SAS computer system 416. A SAS computer system 416 may comprise a typical personal computer system or industrial networked server system. In a preferred embodiment, a SAS computer system 416 communicates with one or more touch-enabled computer screens 460.

In the event no LPN is available to scan either on a product 402A, 402B or a container 412, or if the handheld scanning device and SAS computer system 416 cannot match the LPN with other product information, the induction operator 404A may select the product from a list in the handheld scanning device 406 or on a computer screen 460. The product may be identified by any information such as, but not limited to, its SKU, LPN, textual description, price, or size. The SAS computer system 416 may alert line operators or induction operators 404A if an unidentified product is inducted onto the SAS line. Alternatively, an operator may manually enter certain minimum product information into the system before submitting an unidentified product onto the SAS line. For example, such product information may include LPN, product size, product orientation, and desired position for an RFID tag relative to the side edges of the product.

Instructions shown on a computer screen 460 may show or provide explanation to induction operators 404A to place products in a non-intuitive way onto the conveyor belt 414 of the induction end 410 of the SAS line. Such instructions may change over time and may vary from product to product depending on how many products have been placed on the conveyor 414. The SAS line may keep track of the number of products on the line through photo-eyes (not shown) or by some other means. The instructions on a computer screen 460 may indicate to place consecutive products onto the conveyor belt 414 in different orientations. FIG. 8A illustrates one example of such instruction where products are removed from a container (e.g. a pallet 412) and oriented according to the instructions. With reference to FIG. 8A, a first product 806 is placed in a first orientation (shown with orientation arrow pointed upward), a second product 804 is placed in a second orientation which is rotated 90 degrees relative to the first product 806, and a third product 802 is also oriented in said first orientation, like the first product 806. Without specific instructions, induction operators may not place products consistently and accurately for best results. For example, induction operators may not place products containing bottles onto the conveyor oriented such that the bottles are horizontal. In a different embodiment, such instructions provided to operators are supplied to automated equipment on the conveyor line instead of humans for execution.

Proper orientation of products on the conveyor 414 according to instructions provides optimal overall placement of the RFID tags on the products. Optimal overall placement may be considered the state whereby all RFID tags are maximally exposed or responsive to interrogation once each product receives an RFID tag and is placed in a container 412. Other RFID tag placement may be considered optimal depending on the particular application. For example, optimal placement may be considered having all RFID tags minimally available to interrogation. A preferred embodiment is to have RFID tags maximally exposed.

With reference to the exiting end 818 of the conveyor 414 of the SAS line in FIG. 8A, the RFID tags 812, 814, 816 are properly placed on the products 802, 804, 806 based on the products' proper orentations when placed onto the conveyor 414 at the entry 410 of the SAS line. As shown in FIG. 8A, the first RFID tag 816 is placed on the front side of the first product 806, and the second and third RFID tags 814, 812 are placed on the side of their respective products 804, 802. Further, the RFID tags are placed in their proper orientation on each product. With reference to FIG. 8A, the first and second RFID tags 816, 814 are placed horizontally relative to the products 806, 804, and the third RFID tag 812 is placed vertically with respect to the third product 802. The proper orientation of the RFID tags 812, 814, 816 may not correspond to the relative orientation of the products 802, 804, 806 (as shown by the orientation arrows) as placed on the SAS line.

The loading or stacking instructions shown on the computer screen 460 are transmitted by the SAS computer 416. The instructions are comprised of images 862 or text 864, or both. The instructions sent to the entry portion 410 of the SAS line are synchronized with the instructions sent to the exit end or container-forming end 818 of the SAS line for stacking of the products. Similarly, the instructions given to the RFID tag applicator (not shown in FIG. 8A) are synchronized with the instructions for orienting each product entering the SAS line. Thus, the products enter the SAS line in a certain orientation, the RFID tag applicator places the RFID tag in a desired location and orientation, and the products are stacked in a desired arrangement in containers. Instructions provided by the system based on various product characteristics or specific RFID tagging requirements may be passed to operators through user interfaces, or to mechanical systems such as automatic palletizer or other material handling equipment. With reference to FIG. 4, when the product is properly identified, either manually or automatically, the SAS computer system 416 passes all necessary EPC data to an encoding device 418. The information may be passed either before or after a particular product 402A, 402B is physically inducted onto the SAS line. The encoding device then creates an RFID tag 422. In one embodiment, an encoding device 418 also prints barcode and/or human readable information on the label portion of the RFID tag 422. Once the product 402A, 402B is properly aligned on the SAS line, either automatically by mechanically acting elements of the SAS line (not shown) or manually by induction operators 404A, the encoded RFID tag 422 is applied to the product 402A, 402B.

The RFID tag 422 is preferably applied to the product 402A, 402B by a machine, but may be affixed manually. If manually applied, instructions are shown to operators as to proper placement of each RFID tag. In one embodiment, the encoding device 418 prints and applies RFID tags 422. Such device is known as an encode/print-and-apply (EPAA) device 418. The EPAA device 418 applies an RFID tag 422 to a desired location on each product. For example, such position may be two inches from a leading edge and three inches from the bottom edge of the product. The position may be different for different types of products or may be different for consecutive products on the SAS line. For example, the positioning of an RFID tag 422 on a first product 402A may be different from the RFID tag position on a second product 402B. The position of an RFID tag 422 may be described in terms of X and Y coordinates and orientation (e.g. horizontal or vertical). The EPAA device 418 may remain stationary and move mechanical parts, including an RFID tag placement head, to apply an RFID tag 422 in the appropriate location on a product 402A, 402B. Alternatively, the entire EPAA device 418 may be moveably positioned relative to the SAS line for proper application of an RFID tag 422 to each product 402A, 402B. Encoding the RFID tag 422, writing human readable or barcode text on the tag, and/or applying the RFID tag 422 may be performed by separate devices. In one embodiment, the RFID tag 422 is applied by one device then encoded by a subsequent device. In another embodiment, the RFID tag 422 is encoded and applied by the same device without human or machine readable text.

One or more photo eyes 450 or other scanning, counting or identifying elements may be used to synchronize identification of each inducted product 402A, 402B with the application of the RFID tag 422 to the appropriate product 402A, 402B by the EPAA device 418. For example, such scanning element may be one or more bar code scanners. Such scanner may be electrically connected to either the SAS computer 416 or to the EPAA device 418, or to the SAS computer 416 and the EPAA device 418.

In one embodiment, at induction, the handheld scanning device 406 stores SKU attributes (e.g. EPC data, tag type, placement orientation, Y location coordinates, X location coordinates, horizontal/vertical orientation) of all products 402 which pass onto the SAS line. Further, the handheld scanning device 406 forwards required information to the SAS computer system 416 as each product 402 is scanned. In such embodiment, the handheld scanning device passes a queue of appropriate RFID tag data or identifying data to the encoding device 418.

The conveyor may accumulate products 402 prior to the encoding device 418 writing information to RFID tags 422. Once information is written to RFID tags 422 with an encoding device 418, the RFID tags 422 are applied by either the EPAA device 418 or by a tag application worker (not shown). The tagged products 402A, 402B next pass to one or more verify stations 420 on the SAS line. A verify station 420 is comprised of one or more RFID interrogators. Verify stations 420 receive verification requirements from the SAS computer 416. An RFID tag 422 is considered invalid if it is improperly placed on the product, if it cannot be read, if its signal is too weak, or if its RFID data do not match what the SAS computer 416 has in its records for that particular tag. Products which have an invalid RFID tag 424 are sent to a rework line 426. Such rejected products 402C may be manually rejected, but preferably are rejected and sent onto the rework line 426 by an ejecting machine 440 which physically pushes or moves the identified product onto the rework line 426. Rejected products 402C on the rework line 426 are sent back through the SAS line for application of another RFID tag 422. Alternatively, the SAS line may stop until an operator removes the item with the rejected tag and manually corrects it.

In one embodiment, line operators 404 uniformly orient products 402 on the SAS line prior to applying RFID tags 422 to each product 402. RFID tags 422 may or may not be applied in the same relative location on each product 402A, 402B. However, in one embodiment, the EPAA machine 418 applies an RFID tag 422 on the same side and in the same relative location of each identified product 402A, 402B. In other embodiments, one or more EPAA machines 418 apply RFID tags 422 to a different location on each passing product to optimize overall placement of RFID tags relative to a corresponding finished container of products. There may be automated mechanical elements that assist in the movement and proper orientation of each product on the SAS line prior to or after application of each RFID tag. Products which are not properly oriented may be passed through the EPAA machine 418 without receiving an RFID tag 422 and may be sent onto a rework line 426. Through such fail-safe method and system, each product 402A, 402B is consistently processed through the SAS line.

Figure 7:
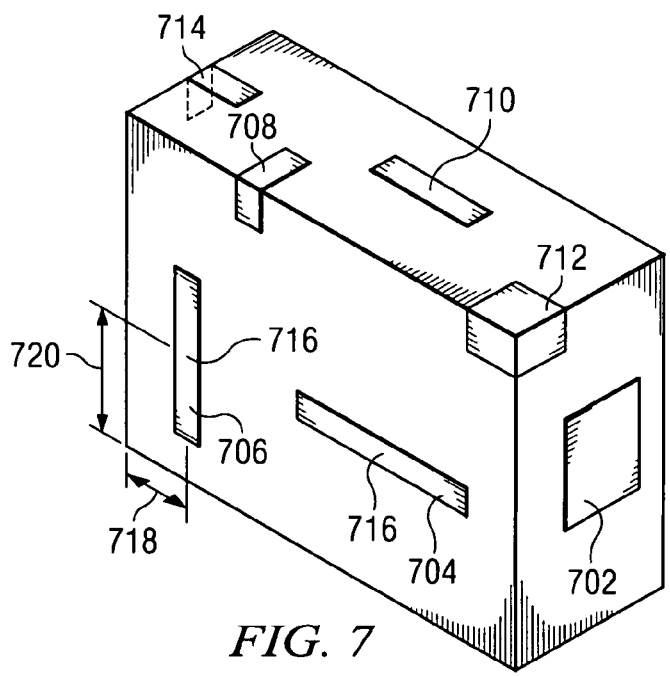
FIG. 7 is a perspective view of a product showing various alternative placements of an RFID tag according to the present invention.

In another embodiment, the tag applicator may automatically make adjustments to apply the RFID tag in the designated X/Y coordinates on each product and/or in a designated orientation. The orientation may be horizontal, vertical, or some other way. FIG. 7 illustrates various locations and orientations of an RFID tag on a product. With reference to FIG. 7, an RFID tag may be applied on a first side 702, second side 704, 706 or third (top) side 710. Alternatively, an RFID tag may be placed on multiple sides such that part of the RFID tag overlays one or more edges or folds of the product. For example, with reference to FIG. 7, an RFID tag 714 may be placed on a leading side and over a top edge such that part of the RFID tag 714 is affixed to the top and side. In another example, an RFID tag 708 may be placed along a side and over a top edge such that part of the RFID tag 708 including any corresponding RFID antenna elements lie along two sides. In yet another example, an RFID tag 712 is placed along the corner of a product carton such that the corner RFID tag 712 is affixed on the top and two sides of the product including any corresponding RFID antenna elements. By having such RFID tags lie along multiple sides, such RFID tags may be more receptive to interrogation.

The orientation of each tag may also be adjusted for each passing product. With reference to FIG. 7, an RFID tag on a side may be in a horizontal orientation 704, in a vertical orientation 706, or in an arbitrary orientation. The orientation may depend on many factors comprising size and shape of RFID antenna components, product size, product composition, product shape, and Ti/Hi configuration of products stacked in a container. FIG. 7 shows three possible variations of RFID tags including a square RFID tag 702, several rectangular RFID tags 704, 706, 708, 710, 714, and a corner-shaped RFID tag 712. Such shapes are by way of example only.

In one embodiment of the invention, the EPAA machine properly places each RFID tag based on the center point 716 of the RFID tag 704, 706 relative to each product. Such center point 716 is a certain X distance 718 from a leading or trailing edge and a certain Y distance 720 from a second edge. The choice of which edges to use depends on which side of the product receives the RFID tag. With reference to the process, a subsequent optical scanner (not shown) may be used to verify the correct tag placement and reject or pass the product appropriately.

With reference to FIG. 4, the encoding device 418 writes all desired EPC data to the RFID circuit in each RFID tag 422 matched to a corresponding product 402A, 402B traveling on the SAS line. The RFID tag 422 may include human-readable information (text or graphics) and/or machine readable information (e.g. barcodes) on its label. In one embodiment, global trade identification numbers (GTINs) and/or serialized numbers for EPC data are written to the RFID tag 422 along with barcode representations of these numbers. These numbers may be unique across all SAS lines being used by one or more users or entities, even ones not at the same physical location. The SAS computer system 416, in conjunction with wireless handheld scanning devices 406, may manage GTIN serializations and EPC data. In one variation, serialized GTINs are comprised of a header, a filter, manufacturer identifier, product identifier, and a serial number. Other variations of information in GTINs for this application are possible.

In one embodiment, the encoding device 418 verifies RFID tags 422 that have been written; failed tags 422 which cannot be read and verified by the encoding device 418 are not applied to any product and are collected by the EPAA device 418. In this manner, only functioning RFID tags 422 are applied to products 402A, 402B on the SAS line. The EPAA device 418 alerts line operators to error conditions (e.g. out of media, medial jams) and allows the SAS line to take any necessary automated action until any error condition is cleared. For example, the SAS line is stopped until the EPAA device 418 is working properly. In one embodiment, an EPC logo, human-readable EPC data, and barcode EPC data are printed on the label of each RFID tag 422. In one embodiment, four inch by two inch RFID tags 422 are used. However, any type, size and shape of RFID tag 422 may be used.

With reference to FIG. 4, an encoding device 418 applies RFID tags 422 to a particular location and in a particular orientation on products 402A, 402B. The SAS line in conjunction with the encoding device 418 provides for adjusting the location of label placement on each passing product (e.g. orientation, Y location, and X location). RFID tag placement may be done by detecting the edge of a product and applying the RFID tag at a location corresponding to a given time delay based upon the speed of the moving product. Various location adjustments may be made in an automated or manual fashion. Additional product identifiers including any other EPC data, in either human or machine readable format, may be printed on the RFID tag label or applied as a separate label.

As products are unloaded at the entry 410 of the SAS line, the handheld scanning device signals the SAS computer system 416 to retrieve tag and/or label position and orientation information (e.g. X location, Y location, and orientation) for each type of product 402A, 402B. This information is sent to the encoding device 418. Alternatively, the handheld scanning device contains such information and passes the information to the SAS computer system 416 which in turn passes the information to the encoding device 418. If RFID tags 422 are manually affixed to each passing product 402 on the SAS line, the SAS computer system 416 communicates to the line operators the orientation and position of the RFID tag 422 for each uniquely identified product. In a preferred embodiment, RFID tags 422 are applied at a minimum speed of 20 products per minute. Other speeds may be desired.

Product EPC data associated with an RFID tag 422 are aggregated for creating a further RFID container tag 432 to track information specifically about an entire container which is newly formed at the end of the SAS line. Such RFID container tag 432 may have embedded in it an SSCC for the container and/or a SSCC for each of the products stacked thereon. Such SSCCs may be generated by any computer including the SAS computer system 416 or may be received from another electrically connected computer system. The SSCC may be either associated with, or embedded in, an RFID container tag 432.

In one embodiment, the SAS computer system 416 has an interface to receive product EPC data for aggregating products into a container. In a further embodiment, the SAS computer system 416 also has an electronic system interface for receiving and storing metrics on EPC data including labeling failures and product deviations. Such metrics may be gathered automatically by the SAS computer system 416 in conjunction with other electrically connected elements, or such metrics may be input by human operators through a human-to-machine interface, or through a combination of the two methods.

In one embodiment, the SAS computer system 416 aggregates product data at the time of verification for the construction of product identifying codes including SSCCs, and for the construction of an RFID container tag 432. Information and/or instructions regarding the tagged products are passed and displayed on a monitor or computer display 460 for container building operators 404B. The instructions include, but are not limited to, a picture or display indicating how the products exiting the SAS line should be stacked into a container. For example, these instructions include a picture or display of a preferred Ti/Hi arrangement of products for a pallet to be built from products exiting the SAS line. Information may be passed directly from one system to the next where elements of a SAS line are separated in space and time. Alternatively, SAS line operators (e.g. container building operators) may select one or more products from a list to acquire further handling instructions or further product information. Throughout the SAS line, identifying information may be human readable or may be machine readable (e.g. in barcode format, numeric only format).

With reference to FIG. 4, a mechanical rejecting element 440 or a line operator (not shown) diverts products when their RFID tags 422 fail validation at a verify station 420. Products 402 may be routed to a re-work station (not shown) and accumulated, sent onto a re-work line 426, or the SAS conveyor 414 may be stopped until the problem is corrected. Preferably, the SAS line is never stopped and any products failing validation are sent through the re-work line 426 whereon they are placed back onto the SAS line. Failed RFID tags 422 on products 402 are usually a rare event. Lights and/or audible alerts notify re-work operators 404C of products 402 carrying an invalid or non-functioning RFID tag 424.

On a re-work line 426, a re-work operator 404C removes failed RFID tags 424 and may report metrics on failures. A re-work operator 404C optionally diagnoses the RFID tag failure, records the reason for the failure, removes the failed RFID tag 424, and re-processes the re-worked product 402C for RFID tag application. Such a re-work operator 404C may use a handheld scanning device 406 to identify the re-worked product 404C and re-enters it back onto the SAS line, or the re-work operator 404C may select the re-worked product 402C from a computer screen (not shown) before re-entering the product 402C back onto the SAS line. Alternatively, the SAS computer keeps track of the re-worked product 402C through the use of photo eyes or other sensors (not shown) on the re-work line 426 and automatically sends the re-worked product 402C back onto the SAS line for a subsequent attempt at properly placing a functioning RFID tag 422 onto the product. In any event, the re-worked product 402C ends up being placed back on the conveyor 414 of the SAS line upstream of where the encoding device 418 creates and applies a functioning RFID tag 422.

An RFID tag 422 may contain EPC data. Alternatively, an RFID tag 422 may contain arbitrary data which can be used to reference other EPC data in a database. A handheld scanning device 406 may induct or pre-process machine-readable or human-readable codes and send them directly to a data queue which the EPAA device 418 uses to create an RFID tag 422. Alternatively, the handheld scanning device 406 may first pass information to a database which is then used to look up other product-related information. This product-related information is then passed to the encoding device 418 to create an RFID tag 422.

With reference to FIG. 4, products 402 are reassembled onto pallets at the end of the SAS line after applied RFID tags 422 have passed validators 420. In one embodiment, a handheld scanning device 406 or computer screen 460 graphically presents a preferred pallet stacking or Ti/Hi arrangement to a container building operator 404B. Alternatively, laminated cards display a preferred Ti/Hi configuration for a particular batch of one type of product or a mixture of different products exiting the SAS line. In one embodiment, products 402A, 402B are hand-stacked on a pallet board which rests on a rotatable ergonomic pallet stand. A motorized stretch-wrapper may be integrated to the pallet stand on which the container building operator 404B wraps a completed pallet. RFID readers may be embedded in this pallet wrapping process to validate RFID product tags and/or an RFID container tag.

In an alternative embodiment, products 402A, 402B are automatically re-stacked by machine elements into a container. For example, products 402A, 402B are directed to an automatic repalletizer which re-stacks products 402A, 402B on a pallet according to a preferred Ti/Hi configuration. In such a situation, for each SKU change-over on the SAS line, or for each container to be built, container building operators 404B manually select correct settings to be used by the palletizer, or these settings may be looked up in a computer system by scanning the UPC/SKU or other barcode of the product entering the palletizer, or these settings or instructions are passed to either the machine or container building operator 404B by the SAS computer 416. An LPN tag may be manually applied to the finished pallet, and the pallet is then sent to an automated stretch wrap station.

With reference to FIG. 8A, three products 802, 804, 806 which leave the conveyor 414 can be stacked in various configurations in a container (e.g. pallet 412). Depending upon the contents of each product, and the placement of each RFID tag on each product, there are one or more optimal Ti/Hi configurations for a set of products. FIG. 8B and FIG. 8C show examples of possible optimal Ti/Hi configurations. With reference to FIG. 8B, the three products 802, 804, 806 shown in FIG. 8A are stacked on a container in a row such that the first RFID tag 816 is on a first external side and the second and third RFID tags 814, 812 are on a second external side. Alternatively, and with reference to FIG. 8C, the three products 802, 804, 806 are not stacked in a row. Consequently, the first RFID tag 816 and the second and third RFID tags 814, 812 end up on opposite sides of a completed container. A finished container, stacked in the desired Ti/Hi configuration, is formed based on instructions passed from the SAS computer (not shown). The desired Ti/Hi configuration is based on the overall placement of RFID tags relative to the finished container. The desired Ti/Hi configuration may be found by trial and error or by mathematical algorithm based upon a number of factors comprising: contents of each product, location of interrogators, and size and shape of container. In one embodiment, the desired Ti/Hi configuration is the arrangement of RFID tags 812, 814, 816 such that a maximum number of RFID tags respond to interrogation. Any numbers and sizes of products may be used to form a completed container within the scope of the present invention. In a further embodiment, at the end of re-stacking a preferred number of properly labeled products onto a container, a container building operator 404B indicates to the SAS computer system 416 when a container has been completed. Alternatively, the SAS computer system 416 tracks the number of products 402A, 402B exiting the SAS line and indicates to container building operators 404B when a first container is complete or when it is appropriate to start stacking a second container of RFID tagged products.

Optionally, a container building operator 404B sends by way of a handheld scanning device 406 EPC and GTIN container information to a second RFID encoder 430. Alternatively, the SAS computer system 416 automatically sends information to a second RFID encoder 430 and has it generate an RFID container label 432. The SAS computer system 416 may then indicate to a container building operator 404B when a container RFID tag 432 is ready to affix to a completed container 442.

This container RFID tag 432 optionally is printed with human readable information and machine-readable information such as, but not limited to, a GTIN or barcode. Such information facilitates shipping and handling of the newly created container of properly RFID-labeled products 442. GTIN serialized numbers and other EPC data are unique across all SAS line locations, and may be managed by a handheld scanning device 406, a SAS computer system 416, or other computer system.

At the end of a SAS line, one embodiment of a method to apply an RFID container tag 432 is as follows. First, a container building operator 404B uses a handheld scanning device 406 to scan one of the first products exiting the SAS line. The handheld scanning device 406 passes information to the SAS computer 416. Information and/or instructions to build a container (e.g. pallet) are displayed on a computer monitor 460. Next, information, either from the handheld scanning device 406 or from the SAS computer 416, is passed to a second RFID encoder 430 whereon an RFID container tag 432 is generated. Such tag may optionally contain GTIN, LPN, and/or EPC information in either human or machine readable format. The RFID container tag 432 may contain the same LPN information which was printed on a container label on a container 412 originally delivered to the SAS line. LPN information may vary depending on the requirements for a particular SAS line. A handheld scanning device 406 or other computer system may provide for issuing LPNs within desired ranges for each SAS line and which are unique across all locations issuing LPNs. Alternatively, the SAS computer 416 manages GTIN serialization and unique LPN generation.

Next, a second RFID encoder 430 writes and verifies RFID container tags 432 before the tags are placed onto a finished container 442 (e.g. pallet). Finally, an additional label printer (not shown) may create separate LPN labels for each completed container 442. In one embodiment, light stacks or audible alarms alert operators of any error conditions (e.g. paper jam at a label printer) involving the second RFID encoder 430.

Properly completed containers 442 are finished when LPN or RFID tags 432 are applied. In some instances, a container may not have a container tag applied until it is ready for shipment, or may not have a container tag applied at all. A container building operator 404B manually applies an LPN label in a location designated locally. For example, an RFID container tag 432 is placed over the stretch wrap in a position that does not overlay an RFID tag 422 on any product 402A, 402B beneath the stretch wrap. An RFID container tag 432 may contain EPC and/or other any other data which may be used to look up and access product and/or order information. After RFID container tag application, operators call for container pick up.

With reference to FIG. 4, the final step in the SAS line is to verify all applied RFID tags, both pallet tags 432 and individual product tags 422. A warehouse operator 404D retrieves finished pallets 442 and passes each pallet past a container verification portal or container interrogator 428. A verification portal 428 may be passed while containers are on a conveyor, a forklift, a pallet wrapper, or other means. Alternatively, a container interrogator 428 may be a handheld or other device that is passed near stationary containers. A verification portal 428 may form part of, or may be near, a doorway or entryway.

A verification portal 428 communicates a successful identification of a finished container 442 when a pre-determined number of RFID product tags 422 are successfully interrogated. The identity or "fingerprint" of a container is a set of RFID product tags 422 successfully interrogated. Not all of the RFID product tags 422 need to be successfully interrogated for successful identification of a particular container 442: the identity of the container 442 does not need to be known with complete accuracy. Interrogating and recognizing a subset of all product identifiers or RFID product tags 422 is sufficient to identify an entire container 442. Many-to-one-to-many relationships may be used to virtually record all items in a container. Such relationships may also be reflected in one or more databases which are used to find and aggregate requested information. For example, information about all of the products on a pallet may be found by reading four RFID tagged products, looking up the common container these products are stacked on, and then looking up all of the products which are also stacked on the same container. This inferred reading may be useful where products in a container may not be read because the RFID tags are turned toward the center of the container and/or are blocked by liquids, metals, or other prevailing conditions or environmental factors.

Recognition of a finished container 442 comprises the steps of interrogating the RFID tags 422 one and in the vicinity of a container 442, compiling a list of recognized RFID tags 422 (e.g. ones which respond to interrogation with sufficient strength), accessing the SAS computer system 416, comparing the list of recognized RFID tags 422 with records or lists of RFID product tags belonging to or associated with containers, and selecting the container (or container record) which has the most matching RFID tags. The containers searched are those which may be, according to the SAS computer system 416, in the exit staging area of the SAS line. The interrogation may detect RFID tags 422 which do not belong to the particular targeted container. So long as a sufficient number of tags are matched to a particular container (or container record), identification is accomplished. The minimum number of matching RFID tags is determined by an administrator, by a SAS line operator or by mathematical algorithm. Once a container is identified, the identity of all RFID tags and any associated information about the products in a particular container may be retrieved from the SAS computer records. A verification portal 428 may be connected to the SAS computer 416, and allied computer networks. The interconnected components of the SAS line may support multiple computer protocols for maximum interoperability.

Figure 9:
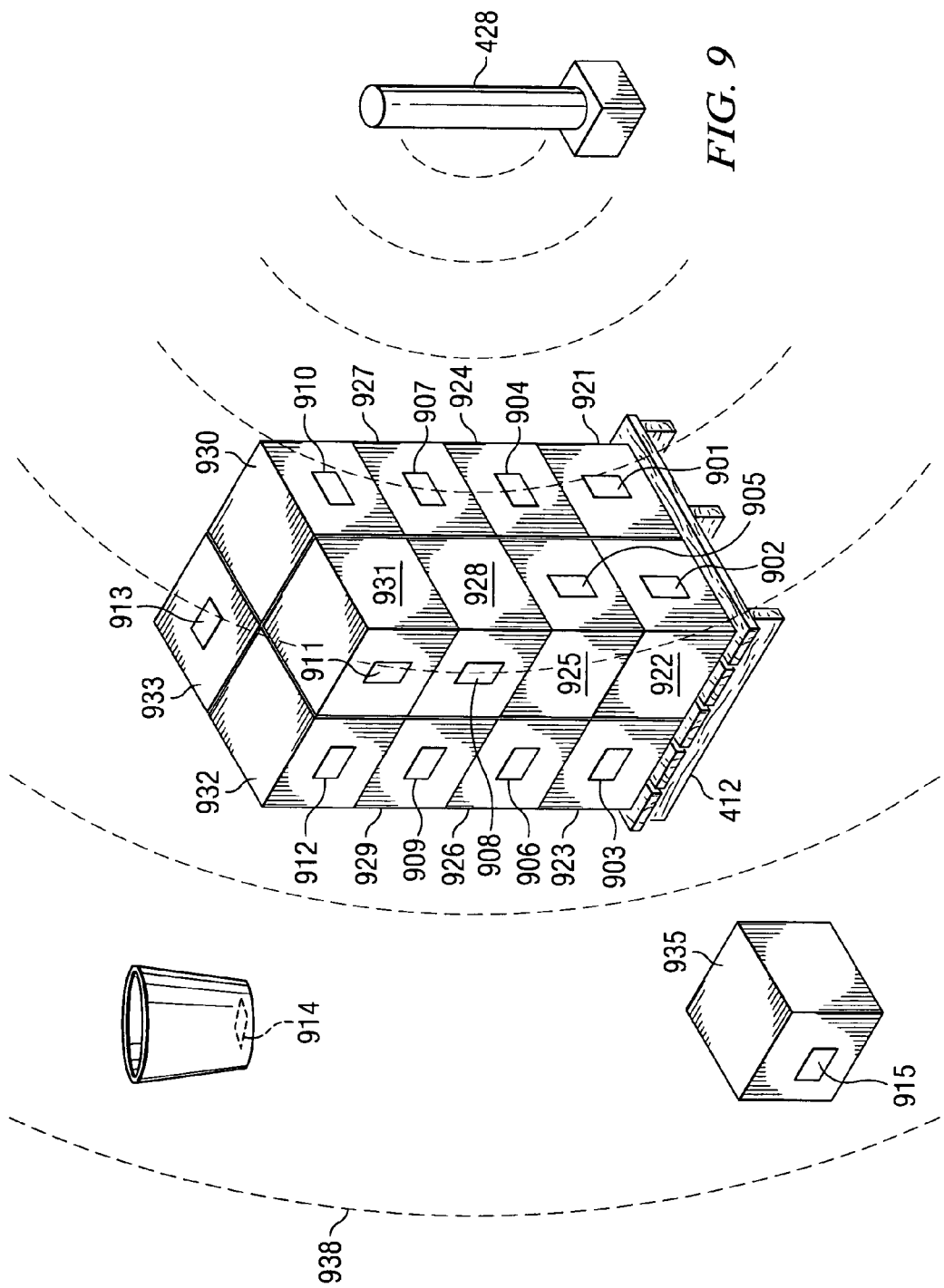
FIG. 9 is a perspective view of an interrogation of RFID tagged products in which a finished container of products is identified based upon recognition of a certain number of RFID tagged products belonging to the finished container according to one embodiment of the present invention.

FIG. 9 illustrates the process of interrogating a group of RFID tagged products after being stacked onto a container and in an RFID-rich environment wherein there are any number of RFID tags within the range of one or more active interrogators. With reference to FIG. 9, a series of products (labeled 921-933) are stacked on a container 412. An RFID tag (labeled 901-913) is affixed to each of these products. However, there may be many other RFID tags in the vicinity including but not limited to a discarded RFID tag 914 and an RFID tag 915 affixed to an unstacked product 935. An interrogator 428 sends out an RF signal 938 designed to illicit a response from all RFID tags within sufficient distance. If identification of a container were based upon the first RFID tag recognized, the wrong container may be inappropriately identified. However, as shown in FIG. 9, if the SAS computer (not shown) evaluates all responding RFID tags and identifies a subset of the RFID tags 901-913 affixed to products 921-933 stacked onto a container 412, the proper identification of the container 412 results and the extraneous RFID tags 914, 915 can be ignored.

If the SAS computer is not able to identify a container, a warehouse operator 404D is alerted to such container identification failure by means of a light stack, an audible alarm, or other means. In a preferred embodiment, a completed container 442 may successfully leave the SAS line when it is successfully identified. The SAS line and associated methods allow users to more quickly and accurately identify and track containers of products and all products within a container. By applying RFID tags to products, a user only needs to "hear" from a subset of RFID tags attached to bundled products in a container to identify all of the products instead of being required to identify each individual product by "seeing" its bar code. Further, a user needs only hear from a subset of the RFID-labeled products from a given container to be able to track the container and all of its products.

If identification of an entire container fails, a warehouse operator 404D takes the container to a re-work station where a warehouse operator 404D diagnoses the problem. In one embodiment, the individual products 402A, 402B are unstacked and re-stacked onto a container before being re-interrogated to ascertain the container's identity. In an extreme situation, the container is de-commissioned and taken to the re-work line 426 where the products are individually scanned and re-sent through the SAS line.

In another embodiment, a warehouse operator 404D uses a handheld interrogator 446 to find and diagnose the problem within a particular container. The handheld interrogator 446 may provide a user interface to assist in the diagnostic effort. In an optional embodiment, a handheld scanning device 446 provides for recording and reporting reasons for initial container tag 432 and container identification failure.

In a further embodiment of a SAS line, once products are re-loaded into a container or "re-palletized," the contents of each container may be certified against either a human-readable label and/or against the RFID record associated with an RFID container tag 432 wherein a warehouse operator 404D or other worker applies a certification label or seal on the container. Each label or seal may have an RFID tag built into it, or it may contain human or computer readable information on it (e.g. text and bar codes). Such a label may contain additional information about the products and container such as the identity of the warehouse operator 404D or certifier. A bill of lading or other label may also be affixed to each container.

A SAS line handles both first-in-first-out (FIFO) and last-in-first-out (LIFO) processing. In a preferred embodiment, products on average travel through a SAS line at a speed of at least 100 feet per second (fps), and preferably in the range of 125-600 fps. The SAS computer system 416 is networked to interrogators of a verify station 420 and handheld scanners 406, and is able to communicate through various computer protocols.

Figure 5:
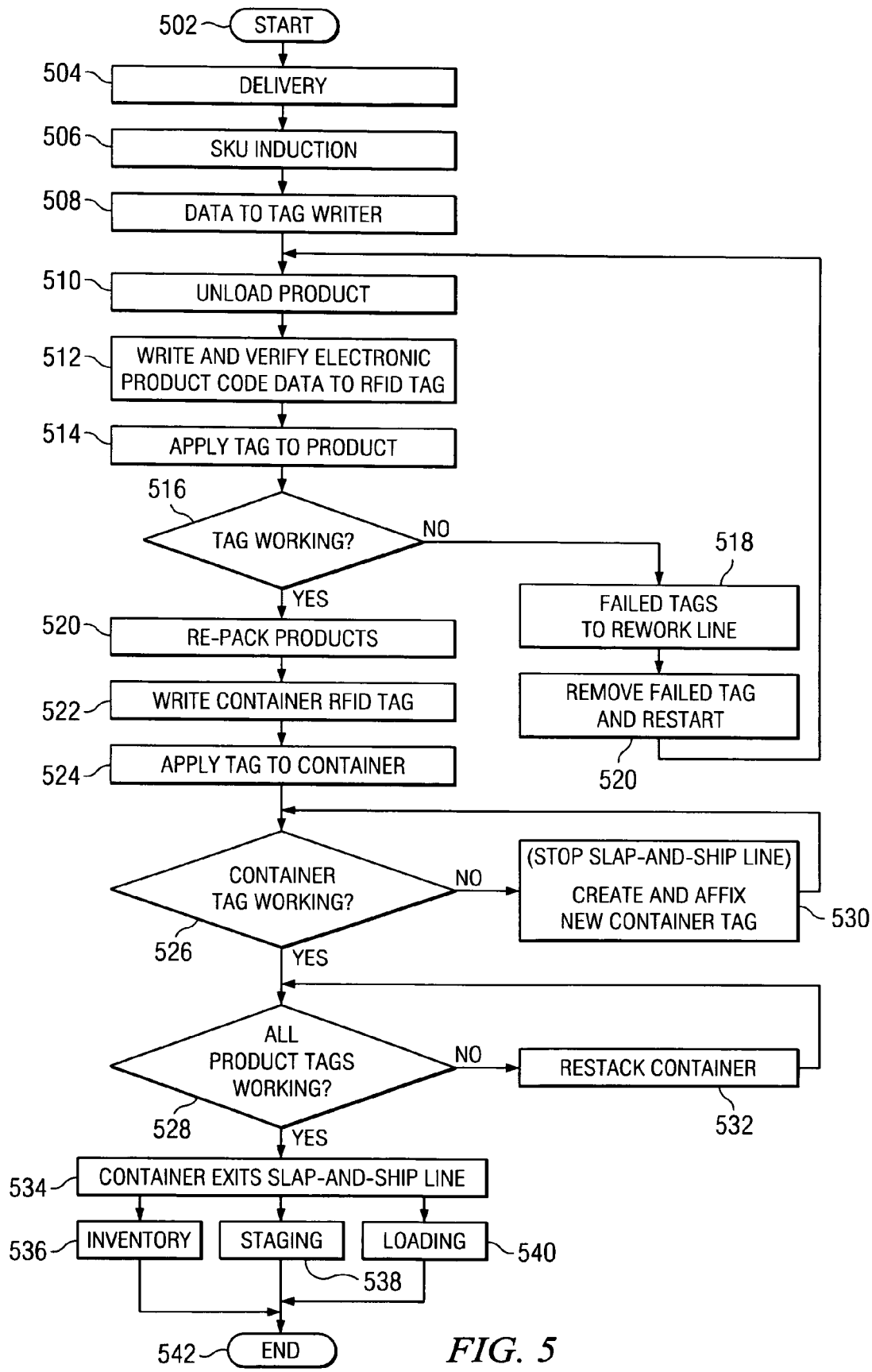
FIG. 5 is a flowchart of the steps involved in the slap-and-ship line according to one embodiment of the present invention.

FIG. 5 shows a conceptual flowchart of one embodiment of the method of the present invention. With reference to FIG. 5, at the start of a SAS line 502, products are brought to a delivery station 504. SKUs or other product data are inducted 506 into a SAS computer system as the products are unloaded onto the SAS line. A handheld scanning device reads LPN, SKU, or other bar code information printed on a pallet label or product label. Alternatively, the data reading triggers the passage of information from a WMS system to the SAS computer system. SKU, EPC, or other information for an RFID product tag is next sent to an RFID tag writer or EPAA 508. The information may be sent for a single tag or for multiple tags in a batch.

Previously, simultaneously, or subsequently to the passing of information to the EPAA, products are unloaded 510 from a container and placed onto a conveyor. Next, an RFID tag is written and verified 512. Such an RFID tag contains data, and preferably EPC data. A line worker or machine applies this product RFID tag 514 to the appropriate product on a SAS line conveyor. The product may be momentarily stopped in front of the EPAA, or it may be continuously moving on a conveyor.

The tagged product then passes by an interrogator that verifies that the RFID tag as placed on the product is working properly 516. If not, an operator or machine moves the product to a rework line 518. An alarm may sound and may take one or more forms including but not limited to an audible alarm, visual light stack, or visible alarm on a GUI. On the rework line, an operator then removes the failed RFID tag 520 and re-sends the product back through the RFID product tag application section of the SAS line and a new EPC code is allocated to the reworked product.

Continuing the method shown in FIG. 5, the products that have a working RFID product tag are placed into a new container 520. An operator then signals an RFID tag writer to create, print and verify an RFID container tag 522. Alternatively, this new RFID container tag is automatically printed by the RFID tag writer without operator intervention. A line operator applies the new RFID container tag 522 to the newly stacked container 524. Other non-RFID container tags may also be produced and applied at this time as needed, such as but not limited to LPN tags and SSCC tags. A finite area in which the container resides is then interrogated to see if the RFID container tag is working 526. If not, a new RFID container or pallet tag is generated and affixed 530.

The next step is to interrogate the entire container to verify whether a sufficient number of RFID product tags may be accessed in their current stacked configuration 528. If not, some or all of the products are removed and restacked onto the container 532.

In one embodiment, such verification involves identifying a statistically significant number of RFID tagged products belonging to a particular designated container or having the same container identifier. Alternatively, such identity is verified by ensuring that a measurement surpasses a statistically significant threshold. Such threshold number may involve one or more measured or calculated numerical values. Such values are comprised of the following non-exclusive list of values: number of RFID product tags responding to interrogation; number of RFID container tags responding to interrogation; quantitative strength of the responding signal from at least one of the RFID tags as measured by the interrogator; arbitrary minimum number of RFID tags; read count of RFID product tags read count of RFID container tags; timestamp associated with an RFID tag; type of product associated with responding RFID tags; status associated with responding RFID tags; lot number associated with responding RFID tags; batch number associated with responding RFID tags; and largest numerical percentage of RFID product tags responding to interrogation relative to the possible number of RFID product tags associated with each container identified by the interrogator.

In a preferred embodiment, any combination of numbers or identifying information associated with a plurality of products may be used to verify the identity of a container so long as the identity of a particular container is reasonably accurate or statistically accurate. The identity of a container is not reasonably accurate if based upon interrogation of a single or few RFID tags when multiple RFID tags are capable of detection and identification. For example, consider the interrogation of an area in which there are two containers: a first container having four RFID tagged products and a second container having forty RFID tagged products. If only three of the four tags from each of the two containers respond, the first container would likely be considered "identified" because 75% of its RFID product tags responded and were successfully identified. However, the second container would likely not be "identified" because only 3 of 40 of its RFID product tags responded and were successfully identified. Note that the second container could be separated or distinguished from stray or isolated RFID product tag readings because three RFID tags belonging to the same container were found within the interrogation area. Such interrogation area may have any number of unstacked RFID labeled products having an associated container identifier or any number of RFID tags which are not associated with a container.

If a plurality of containers is identified based upon a threshold value, the SAS computer system may prompt an operator to identify or verify the presence of the correct container from a list of containers on a computer screen or by some other means. Alternatively, the SAS computer system may prompt an operator to re-interrogate a smaller region so as to read fewer RFID tags for proper identification of a particular container.

Once a container has passed all verification and identification steps, it exits the slap-and-ship line 534 and it is then ready to be sent back to inventory 536, to a staging area 538, or to a loading area 540 wherefrom it may be shipped to another location. When a container has reached one of these areas, the RFID tagging method is ended 542.

In one embodiment of a SAS line process, a WMS is notified of product identification and status within the process. During SAS line activities, a handheld or other scanning device sends product and container status information to the WMS. Alternatively, the WMS accesses the handheld scanning device tables for SKU and traceability data, or accesses the information found within the SAS computer system to acquire product and container information. LPNs may be scanned and may be used to request SKU and other data thereby enabling traceability.

Figure 6:
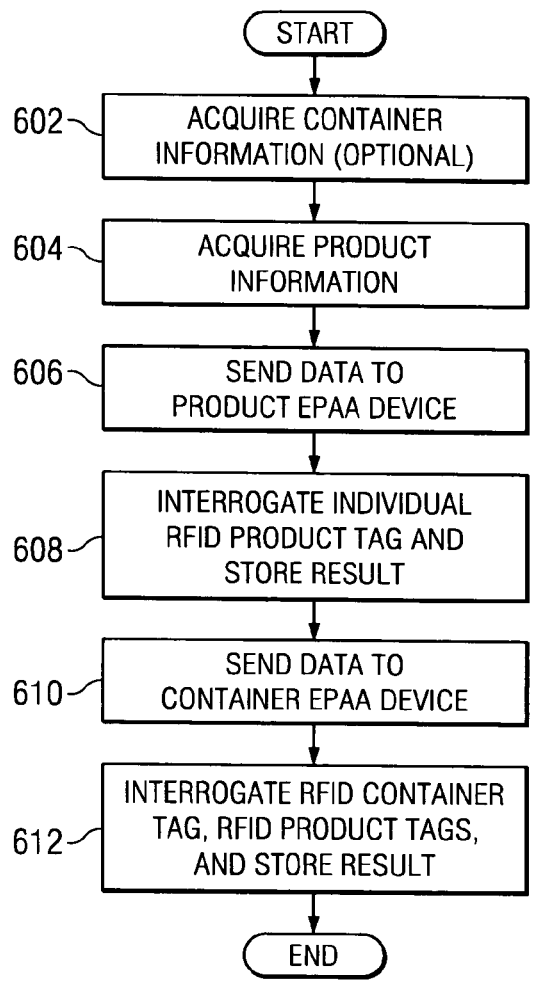
FIG. 6 is a flowchart of the steps involved in the transfer of information involved in the slap-and-ship process according to one embodiment of the present invention.

FIG. 6 illustrates the transfer of information among the various computer components of a SAS line. In a preferred embodiment, an "execute and record" method is used wherein the physical products are first processed, and then a record containing the details of what actually transpired is created. Alternatively, the slap-and-ship line may be operated according to a synchronized execution or a "plan and execute" methodology wherein a plan is created and deviations from the plan are recorded and handled in the information system. For example, a series of SSCC's may be allocated for RFID tags and if a tag subsequently fails, the non-used SSCC is accordingly accounted for.

With reference to FIG. 6, the SAS process starts when container information 602 is acquired. This information may be found on a container label. In one embodiment, this information is wirelessly relayed to a SAS computer system. Subsequently, at about the time products are unloaded or passed onto the SAS line, product information 604 from each product is acquired. This product information may be electronically relayed to the SAS computer system, either wirelessly or by some other means. For example, a barcode scanner on the SAS line may read barcode information on passing products.

Optionally, the SAS computer system checks if all of the products associated with a particular container (as associated with the information on a container's label) are actually received onto the SAS line.

Next, information is passed to an EPAA device 606 for creating an RFID product tag. Subsequently, each product is passed by an interrogator where each RFID product tag is checked for functionality. The information on the RFID product tag and the result of the interrogation are recorded 608. The products bearing rejected RFID product tags are passed onto a re-work line.

Products bearing functional RFID tags are re-packed into containers (e.g. re-stacked onto pallets). At about this time, information is passed to a second EPAA device 610 which generates an RFID container tag. This RFID container tag is applied to a completed container. Finally, the completed container is interrogated to check the functionality of the RFID container tag, the RFID product tags, and the results are stored for later use 612. Only a subset of the RFID product tags needs to pass this interrogation step. However, the RFID container tag needs to be verified. If not, an operator removes the container tag and generates a functional one. When the RFID container tag is verified, the method is complete and a container of RFID-labeled products is produced. The containers are then free to be shipped to other locations.

The foregoing discussion of the invention has been presented for purposes of illustration and description. Each step of the methods described above may be formed separately and may be separated by any amount of time and/or distance. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted.

I claim:

1. A method for applying RFID tags to a plurality of products processed through an assembly line comprising the steps of:
   (a). acquiring product information about each of the plurality of products;
   (b). encoding an RFID tag with an identifying data string for each of the plurality of products;
   (c). applying an RFID tag to each of the plurality of products;
   (d). verifying the integrity of each RFID tag of step (c);
   (e). assigning a product code to each RFID tag verified in step (d); and,
   (f). associating each product code to the product information of step (a).

2. The method of claim 1 wherein the acquiring product information of step (a) comprises the steps of:
   scanning a product identifier from computer-readable information on a label affixed to at least one of the plurality of products;
   searching a database of product information to find the product information associated with the product identifier; and,
   passing the product information to a machine which stores data in each RFID tag.

3. The method of claim 2 wherein the data stored in each RFID tag is a unique sequence of digits.

4. The method of claim 1 wherein the assembly line is a SAS line.

5. The method of claim 1 wherein the verifying of step (d) is by interrogating the RFID tag with an RF signal.

6. The method of claim 1 wherein the method is preceded by the step of receiving a container of products at an entry to the SAS line and unloading the plurality of products onto the SAS line from the container.

7. The method of claim 5 further comprising the step of stacking the plurality of RFID tagged products into the container.

8. The method of claim 1 further comprising the step of stacking the plurality of products into a new container.

9. The method of claim 1 wherein assigning of a product code of step (e) precedes the applying of an RFID tag to each of a plurality of products of step (c).

10. The method of claim 1 wherein the acquiring product information of step (a) is by scanning computer readable information from a container label affixed to the container.

11. The method of claim 1 further comprising the step of creating an RFID container tag for each of at least one container wherein the container tag is written with information which can be used to track the contents of the container in commerce.

12. The method of claim 1 further comprising the step of:
    (g). assigning each of the plurality of products to a container.

13. The method of claim 12 further comprising the steps of:
    (h). interrogating a collection of RFID tags attached to a second plurality of products; and,
    (i). identifying a subset of the collection of RFID tags of step (h) belonging to one particular container.

14. The method of claim 13 wherein the identifying of step (i) is by searching a database using an identifying data string obtained from the interrogation of RFID tags of step (h).

15. The method of claim 1 further comprising the steps of:
    (g). interrogating RFID tags in the vicinity of a container;
    (h). compiling a first list of recognized RFID tags;
    (i). retrieving a second list of RFID tags from a set of container records in a computer system wherein each container record has a list of RFID tags associated with it;
    (j). comparing the first list of recognized RFID tags of step (h) with the second list of RFID tags of step (i); and,
    (k). selecting the container record of step (i) which has a statistically significant number of RFID tags matching those RFID tags in the first list of step (h).

16. A method of identifying all products associated with a container wherein each product is tagged with an RFID tag comprising the steps of:
    (a). interrogating RFID tags in a finite area;
    (b). retrieving a container identifier for each of the successfully interrogated RFID tags;
    (c). forming a list of such container identifiers;
    (d). selecting a container identifier according to at least one statistically significant criterion from the list of such container identifiers, wherein the at least one statistically significant criterion is being greater than a threshold value; and,
    (e). retrieving a product identifier from a database for each of the products having the selected container identifier.

17. The method of claim 16 wherein at least one assembled container resides within the finite area.

18. The method of claim 16 wherein the at least one statistically significant criterion comprises a calculation comprising at least one of the following non-exclusive list of numerical values: number of RFID product tags responding to interrogation; number of RFID container tags responding to interrogation; quantitative strength of the responding signal from at least one of the RFID tags as measured by the interrogator; arbitrary minimum number of RFID tags; read count of RFID container tags; read count of RFID product tags; timestamp associated with an RFID tag; type of product associated with responding RFID tags; status associated with responding RFID tags; lot number associated with responding RFID tags; batch number associated with responding RFID tags; and largest numerical percentage of RFID product tags responding to interrogation relative to the possible number of RFID product tags associated with each container identified by the interrogator.

19. A method of identifying all products associated with a container wherein each product is tagged with an RFID tag comprising the steps of:
 (a). interrogating RFID tags in a finite area;
 (b). retrieving a container identifier for each of the successfully interrogated RFID tags;
 (c). forming a list of such container identifiers;
 (d). selecting a container identifier according to at least one statistically significant criterion from the list of such container identifiers; and
 (e). retrieving a product identifier from a database for each of the products having the selected container identifier,
 wherein the at least one statistically significant criterion comprises a calculation comprising at least one of the following non-exclusive list of numerical values: number of RFID product tags responding to interrogation; number of RFID container tags responding to interrogation; quantitative strength of the responding signal from at least one of the RFID tags as measured by the interrogator; arbitrary minimum number of RFID tags; read count of RFID container tags; read count of RFID product tags; timestamp associated with an RFID tag; type of product associated with responding RFID tags; status associated with responding RFID tags; lot number associated with responding RFID tags; batch number associated with responding RFID tags; and largest numerical percentage of RFID product tags responding to interrogation relative to the possible number of RFID product tags associated with each container identified by the interrogator.

20. The method of claim 19 wherein at Least one assembled container resides within the finite area.

21. The method of claim 19 wherein the at least one statistically significant criterion is being greater than a threshold value.

\* \* \* \* \*